(12) United States Patent
Fujimoto

(10) Patent No.: US 12,208,813 B2
(45) Date of Patent: Jan. 28, 2025

(54) ARITHMETIC OPERATION DEVICE FOR AUTOMOBILES

(71) Applicant: Mazda Motor Corporation, Hiroshima (JP)

(72) Inventor: Hideomi Fujimoto, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 592 days.

(21) Appl. No.: 17/598,299

(22) PCT Filed: Mar. 2, 2020

(86) PCT No.: PCT/JP2020/008739
§ 371 (c)(1),
(2) Date: Sep. 27, 2021

(87) PCT Pub. No.: WO2020/202977
PCT Pub. Date: Oct. 8, 2020

(65) Prior Publication Data
US 2022/0176980 A1 Jun. 9, 2022

(30) Foreign Application Priority Data
Mar. 29, 2019 (JP) ................................. 2019-068283

(51) Int. Cl.
*B60W 50/035* (2012.01)
*B60W 50/04* (2006.01)
(Continued)

(52) U.S. Cl.
CPC ........ *B60W 50/035* (2013.01); *B60W 50/045* (2013.01); *B60W 50/14* (2013.01); *B60W 60/001* (2020.02); *G06F 1/20* (2013.01)

(58) Field of Classification Search
CPC .. B60W 50/035; B60W 50/045; B60W 50/14; B60W 60/001; B60W 60/0018;
(Continued)

(56) References Cited

U.S. PATENT DOCUMENTS

2018/0050704 A1 2/2018 Tascione et al.
2018/0335775 A1* 11/2018 Konishi ............... G05D 1/0061
(Continued)

FOREIGN PATENT DOCUMENTS

CN 208216987 U * 12/2018
CN 117151696 B * 1/2024
JP 2018-181475 A 11/2018

OTHER PUBLICATIONS

CN 117151696 english (Year: 2024).*
(Continued)

*Primary Examiner* — Jelani A Smith
*Assistant Examiner* — Paul A Castro
(74) *Attorney, Agent, or Firm* — XSENSUS LLP

(57) ABSTRACT

An arithmetic operation device for automobiles includes an arithmetic element state detection unit that detects a parameter indicating a state of an arithmetic element, an external device detection unit that detects a use state of a device that affects the parameter, and a mode selection unit that selects one of a normal mode in which both a basic traveling function unit that can execute control related to a basic traveling function and an automatic driving function unit that can execute control related to an automatic driving function and a degeneration mode in which only the basic traveling function unit is operated, and the mode selection unit selects the degeneration mode when the parameter exceeds a threshold or when it is predicted that the parameter exceeds the threshold.

13 Claims, 8 Drawing Sheets

(51) Int. Cl.
  *B60W 50/14* (2020.01)
  *B60W 60/00* (2020.01)
  *G06F 1/20* (2006.01)
(58) Field of Classification Search
  CPC ....... B60W 60/00186; B60W 2050/065; G06F
       1/20; G06F 11/3013; G06F 11/3058;
                 G06F 2201/81
  See application file for complete search history.

(56) References Cited

U.S. PATENT DOCUMENTS

| | | |
|---|---|---|
| 2018/0349205 A1 | 12/2018 | Kolluru et al. |
| 2019/0050032 A1 | 2/2019 | Wang et al. |
| 2019/0210737 A1* | 7/2019 | Enke .................... B64C 39/024 |
| 2020/0238787 A1* | 7/2020 | Awad Alla .............. G06F 1/206 |

OTHER PUBLICATIONS

CN 208216987 English (Year: 2024).*
International Search Report and Written Opinion mailed on Jun. 2, 2020, received for PCT Application PCT/JP2020/008739, Filed on Mar. 2, 2020, 9 pages including English Translation.

* cited by examiner

ARITHMETIC OPERATION DEVICE FOR AUTOMOBILES

CROSS-REFERENCE TO RELATED APPLICATIONS

The present application is based on PCT filing PCT/JP2020/008739, filed Mar. 2, 2020, which claims priority to JP 2019-068283, filed Mar. 29, 2019, the entire contents of each are incorporated herein by reference.

TECHNICAL FIELD

The technology disclosed herein belongs to a technical field related to an arithmetic operation device for automobiles.

BACKGROUND ART

Conventionally, an arithmetic operation device for automobiles mounted on an automobile capable of executing automatic driving control has been known.

For example, Patent Document 1 discloses, as an arithmetic operation device for automobiles, an arithmetic driving control device for automobiles, the arithmetic driving control device including a control unit that executes automatic driving control for a vehicle and a battery temperature detection unit that detects temperature of a battery that supplies power used for driving the vehicle and configured such that, under a first situation where the battery temperature detection unit is not normal, the control unit executes one or both of first limit control to limit at least some of functions of the automatic driving control and second limit control to limit at least some of non-automatic driving functions that are unnecessary functions for automatic driving control among functions of the vehicle in order to increase power supplied from the battery for automatic driving control.

CITATION LIST

Patent Document

PATENT DOCUMENT 1: Japanese Unexamined Patent Publication No. 20018-181475

SUMMARY OF THE INVENTION

Technical Problems

Incidentally, in automatic driving control, in general, vehicle external environment information is acquired by a camera or the like and a route on which a vehicle is to travel is calculated based on the acquired vehicle external environment information. In automatic driving control, in order to recognize a vehicle external environment, an enormous amount of image data needs to be processed. Therefore, in an environment where an amount of data to be processed is large, there is a probability that heavy loads are applied to an arithmetic operation device and a function thereof is deteriorated.

In view of the foregoing, a technology disclosed herein has been devised, and it is therefore an aspect of the present disclosure to suppress, in an arithmetic operation device for automobiles mounted on an automobile capable of executing automatic driving control, deterioration of an automatic driving function of the arithmetic operation device.

Solutions to the Problems

In order to solve the above-described problem, the technology disclosed herein is directed to an arithmetic operation device for automobiles mounted on an automobile capable of automatic driving control, the arithmetic operation device includes an arithmetic element, an arithmetic element state detection unit that detects a parameter indicating a state of the arithmetic element, an external device detection unit that detects a use state of an external device that affects the parameter from outside of the arithmetic element, a basic traveling function unit provided in the arithmetic element and configured to execute control related to a basic traveling function of the automobile, an automatic driving function unit provided in the arithmetic element and configured to execute control related to an automatic driving function of the automobile, and a mode selection unit provided in the arithmetic element and configured to select, based on a detection result of the arithmetic element state detection unit and a detection result of the external device detection unit, one of a normal mode in which both the basic traveling function unit and the automatic driving function unit are operated and a degeneration mode in which only the basic traveling function unit is operated, and is configured such that the mode selection unit selects the degeneration mode when the parameter exceeds a threshold or when it is predicted that the parameter exceeds the threshold.

According to this configuration, the normal mode or the degeneration mode is selected based on the parameter (for example, temperature or an amplitude of a voltage) indicating the state of the arithmetic element and the use state of the device. In the normal mode, since automatic driving control is executed, a load applied to the arithmetic element is relatively large. On the other hand, in the degeneration mode, since only the basic traveling function unit is operated, the load applied to the arithmetic element is relatively small. Therefore, by selecting the normal mode or the degeneration mode in accordance with the parameter indicating the state of the arithmetic element, the arithmetic operation device can be properly used in accordance with the state of the arithmetic operation device for automobiles. As a result, deterioration of the automatic driving function can be suppressed.

In one embodiment of the arithmetic operation device for automobiles, the parameter includes temperature of the arithmetic element, the arithmetic element state detection unit includes a temperature detection section, and the mode selection unit selects the degeneration mode when the temperature of the arithmetic element becomes predetermined temperature or more or when it is predicted that the temperature of the arithmetic element becomes the predetermined temperature or more.

That is, when the temperature of the arithmetic element increases, a function of the arithmetic element tends to be deteriorated. Therefore, by setting the degeneration mode when the temperature of the arithmetic element is high to reduce the load of the arithmetic element, an increase of the temperature of the arithmetic element can be suppressed, so that deterioration of the function of the arithmetic element can be suppressed. Accordingly, deterioration of the automatic driving function can be more effectively suppressed.

In the above-described one embodiment, the arithmetic operation device may be configured such that the external device includes a cooling device mounted on the automobile, and the mode selection unit predicts whether the temperature of the arithmetic element is the predetermined temperature or more in consideration of a use state of the cooling device detected by the external device detection unit.

According to this configuration, an increase of the temperature of the arithmetic element is suppressed during an operation of the cooling device. Therefore, prediction of whether the temperature of the arithmetic element becomes the predetermined temperature or more changes in accordance with the use state of the cooling device. Accordingly, by taking the use state of the cooling device into consideration, prediction accuracy for the state of the arithmetic element is increased. As a result, deterioration of the automatic driving function can be further more effectively suppressed.

In the above-described one embodiment in which the external device includes the cooling device, the arithmetic operation device may further include a notification unit that, when the mode selection unit selects the degeneration mode, notifies an occupant of the automobile that the mode selection unit has selected the degeneration mode, and a cooling control unit that controls an operation of the cooling control device, and may be configured such that the cooling control unit increases cooling ability of the cooling device simultaneously with or after notification by the notification unit.

According to this configuration, the occupant of the automobile is notified by the notification device that the degeneration mode has been selected, and therefore, can recognize that the automatic driving control has been released. Moreover, simultaneously with or after notification, the cooling ability of the cooling device is increased, and therefore, the temperature of the arithmetic element can be reduced, so that a mode of the arithmetic element can be switched from the degeneration mode to the normal mode.

In the above-described one embodiment, the arithmetic operation device can be configured such that the external device includes an external communication device mounted on the automobile and configured to output information communicated with the outside of the automobile to the arithmetic element, and the mode selection unit predicts whether the temperature of the arithmetic element is the predetermined temperature or more in consideration of a communication amount of the external communication device detected by the external device detection unit.

That is, when the communication amount of the external communication device increases, the load applied to the arithmetic element increases. Because of this, the temperature of the arithmetic element tends to be increased. Therefore, prediction of whether the temperature of the arithmetic element becomes the predetermined temperature or more changes in accordance with the communication amount of the external communication device. Accordingly, by taking the communication amount of the external communication device into consideration, prediction accuracy for the state of the arithmetic element is increased. As a result, deterioration of the automatic driving function can be further more effectively suppressed.

In another embodiment of the arithmetic operation device for automobiles, the parameter includes a voltage applied to the arithmetic element, the arithmetic element state detection unit includes a voltage detection section, and the mode selection unit selects the degeneration mode when an amplitude of the voltage applied to the arithmetic element is a predetermined amplitude or more or when it is predicted that the amplitude of the voltage applied to the arithmetic element is the predetermined amplitude or more.

In general, when information processed by the arithmetic element increases, undershoot of the voltage is increased. When the undershoot of the voltage is increased, a starting voltage is insufficient, so that an arithmetic capacity of the arithmetic element tends to be reduced. Therefore, by setting the degeneration mode when the amplitude of the voltage applied to the arithmetic element is large to reduce the load of the arithmetic element, the undershoot of the voltage can be suppressed. Thus, deterioration of the automatic driving function can be more effectively suppressed.

In the above-described another embodiment, the arithmetic operation device may be configured such that the external device includes an external communication device mounted on the automobile and configured to output information communicated with the outside of the automobile to the arithmetic element, and the mode selection unit predicts whether the amplitude of the voltage of the arithmetic element is the predetermined amplitude or more in consideration of a communication amount of the external communication device detected by the external device detection unit.

That is, in an area, such as an urban area or the like, where there is heavy traffic, an amount of information output from the external communication device to the arithmetic element is increased, and therefore, information processed by the arithmetic element is increased, so that the undershoot of the voltage applied to the arithmetic element tends to be increased. Therefore, prediction of whether the amplitude of the voltage becomes the predetermined amplitude or more changes in accordance with the communication amount of the external communication device. Accordingly, by taking the communication amount of the external communication device into consideration, prediction accuracy for the state of the arithmetic element is increased. As a result, deterioration of the automatic driving function can be further more effectively suppressed.

Another aspect of the technology disclosed herein is directed to an arithmetic operation device for automobiles mounted on an automobile capable of automatic driving control, the arithmetic operation device may include an arithmetic element, an arithmetic element state detection unit that detects a parameter indicating a state of the arithmetic element, an external device detection unit that detects a use state of an external device that affects the parameter from outside of the arithmetic element, a basic traveling function unit provided in the arithmetic element and configured to execute control related to a basic traveling function of the automobile, an automatic driving function unit provided in the arithmetic element and configured to execute control related to an automatic driving function of the automobile, and a mode selection unit provided in the arithmetic element and configured to select, based on a detection result of the arithmetic element state detection unit and a detection result of the external device detection unit, one of a normal mode in which both the basic traveling function unit and the automatic driving function unit are operated, an intermediate mode in which both the basic traveling function unit and the automatic driving function are operated while a function of the automatic driving function unit is compared to that in the normal mode to limit the function, and a degeneration mode in which only the basic traveling function unit is operated, and may be configured such that the mode selection unit selects the degeneration mode when the parameter exceeds a threshold and, on the other hand, selects the intermediate mode when it is predicted that the parameter exceeds a threshold.

According to this configuration, by selecting the intermediate mode and comparing the function of the automatic driving function unit to that in the normal mode to limit the function, the parameter (the temperature of the arithmetic element and the amplitude of the voltage) can be prevented from exceeding the threshold as much as possible. Moreover, by interposing the intermediate mode once, even when the degeneration mode is eventually selected, an uncomfortable feeling is not given to the occupant of the automobile. Thus, deterioration of the automatic driving function can be further more effectively suppressed.

ADVANTAGES OF THE INVENTION

As has been described above, according to the technology disclosed herein, in an arithmetic operation device for automobiles mounted on an automobile capable of executing automatic driving control, deterioration of an automatic driving function of the arithmetic operation device can be suppressed.

DESCRIPTION OF EMBODIMENTS

Exemplary embodiments will be described in detail below with reference to the accompanying drawings.

First Embodiment

Figure 1:
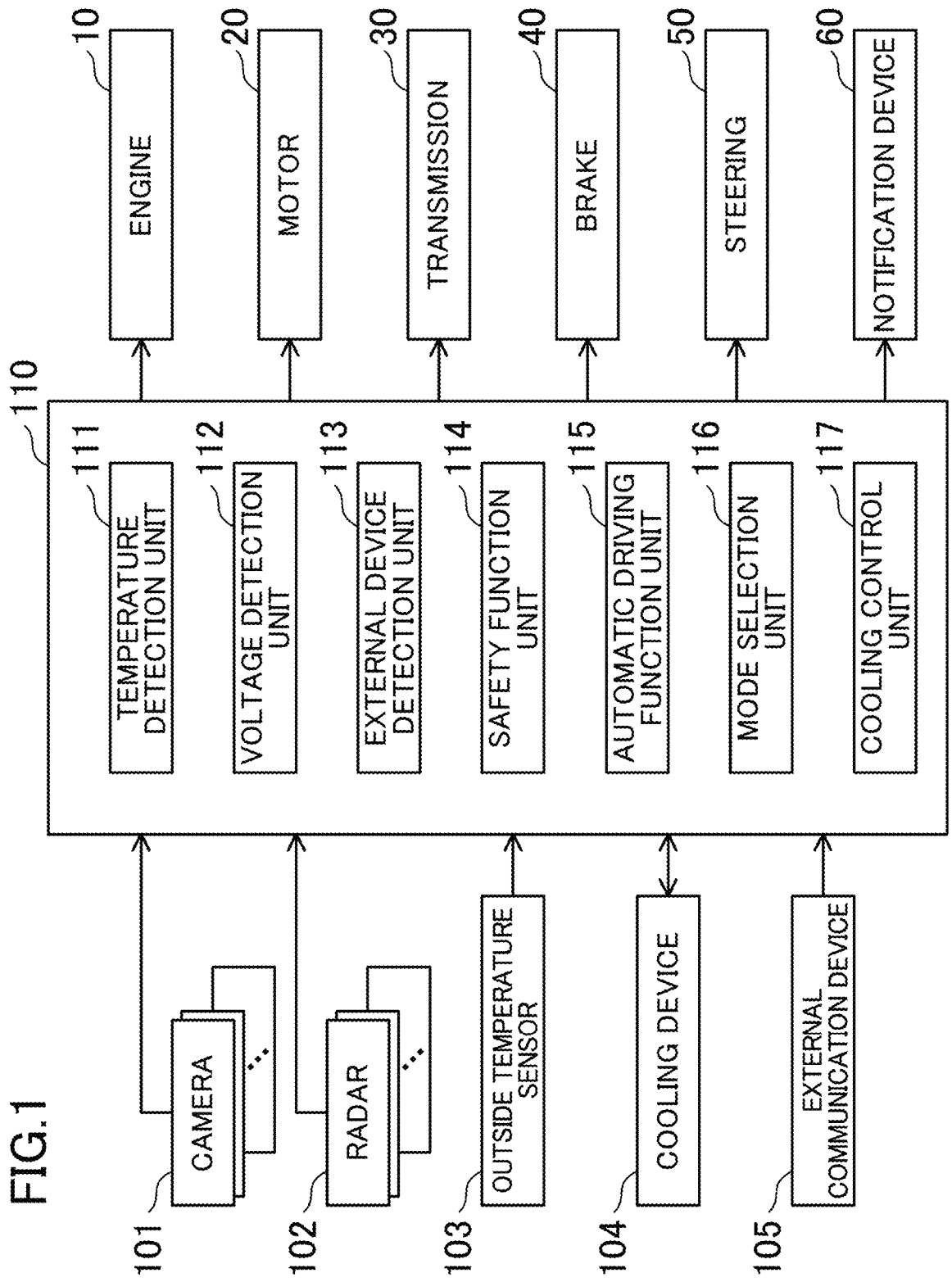
FIG. 1 is a block diagram illustrating a functional configuration of an arithmetic operation device for automobiles according to a first embodiment.

FIG. 1 illustrates a functional configuration of an arithmetic operation device for automobiles (which will be hereinafter merely referred to as an arithmetic operation device) according to a first embodiment. The arithmetic operation device is mounted on a vehicle of automobile. The vehicle is capable of executing automatic driving control. The arithmetic operation device includes an arithmetic element 110 that performs an arithmetic operation for executing automatic driving control.

A function of the arithmetic element 110 is realized by a single chip in some cases, and is realized by a plurality of chips in other cases. In a case where the function of the arithmetic element 110 is realized by a plurality of chips, the plurality of chips may be mounted on a common substrate and may be mounted on different substrates.

Figure 2:
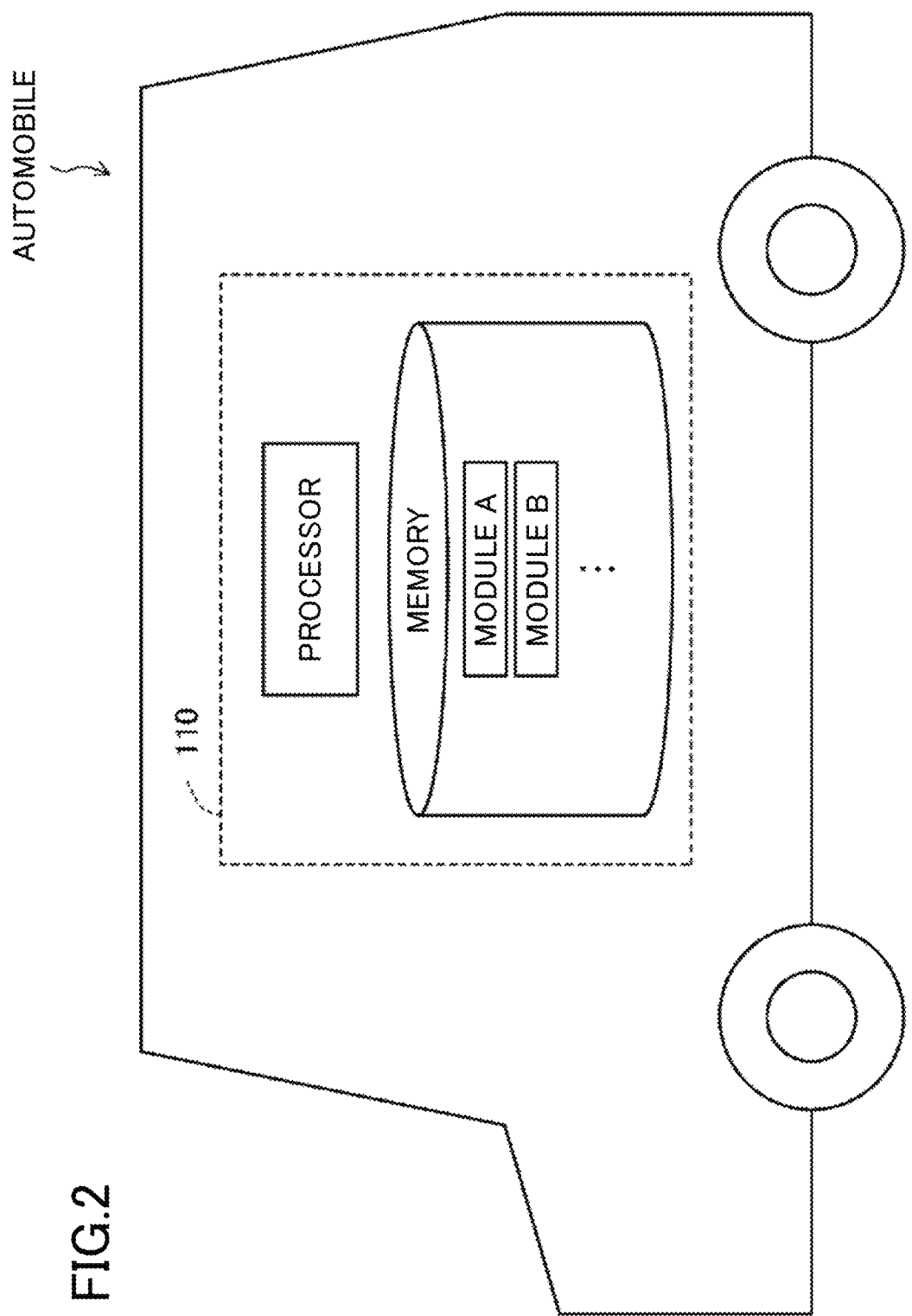
FIG. 2 is a schematic view illustrating an automobile in which the arithmetic operation device for automobiles according to the first embodiment is mounted.

As illustrated in FIG. 2, the arithmetic element 110 is mounted on the vehicle in a state where the arithmetic element 110 is constituted in a single housing. The arithmetic element 110 includes a processor having a CPU, a memory in which a plurality of modules are stored, or the like.

Traffic information, such as information of a vehicle external environment from a camera 101, a radar 102, or the like mounted on the vehicle, information from an outside temperature sensor 103 provided outside the arithmetic element 110 and configured to detect temperature affecting temperature of the arithmetic element 110, information from a cooling device 104, such as an air-conditioner or the like, mounted on the vehicle, navigation information acquired by an external communication device 105 configured to perform communication with a device outside the vehicle, or the like are input to the arithmetic element 110.

The camera 101 mounted on the vehicle captures an image of surroundings of the vehicle and outputs captured image data. The radar 102 mounted on the vehicle transmits an electric wave toward the surroundings of the vehicle and receives a reflected wave from an object. The radar 102 measures a distance from the vehicle to the object and relative speed of the object with respect to the vehicle, based on a transmission wave and a reception wave. As an example of a device that acquires information of a vehicle external environment, in addition to the camera 101, a laser radar, an ultrasonic wave sensor, or the like can be employed.

The outside temperature sensor 103 detects temperature other than the temperature of the arithmetic element 110. The outside temperature sensor 103 detects, for example, air temperature outside the vehicle, temperature in a vehicle cabin, and temperature of a device disposed near the arithmetic operation device (for example, wall temperature of an engine or wall temperature of an exhaust passage).

The cooling device 104 is disposed in a position where the cooling device 104 can cool down the arithmetic element 110. Examples of the cooling device 104 include an air-conditioner provided in the vehicle cabin, for example, in a case where the arithmetic element 110 is disposed in the vehicle cabin and include a grill shutter that takes in a traveling wind in the engine room, or the like, for example, in a case where the arithmetic element 110 is disposed in an engine room or near the engine room.

The external communication device 105 acquires information via a network and outputs the information to the arithmetic element 110. Examples of information received by the external communication device 105 include, for example, map information, traffic information, communication information from another vehicle, or the like.

The arithmetic element 110 outputs a control signal to a control device that controls each of devices of the vehicle. The devices include an engine 10, a motor 20, a transmission 30, a brake 40, a steering 50, and a notification device 60.

The engine 10, the motor 20, and the transmission 30 form a power train and generate a driving force with which the vehicle travels. A control signal related to an ignition timing, a fuel injection quantity, or the like of the engine 10, information related to a current supplied to the motor 20, and a control signal used for changing a gear stage of the transmission 30 are output from the arithmetic element 110.

The brake 40 generates a braking force that decelerates the vehicle. A control signal that drives a brake actuator of the brake 40 is output from the arithmetic element 110.

The steering 50 controls a steering angle at which the vehicle goes around a curve. Control signals related to a current supplied to an electronic power assist steering (EPAS) device of the steering 50 and the steering angle are output from the arithmetic element 110.

As will be described in detail later, the notification device 60 notifies an occupant of the vehicle of switching a mode of the arithmetic element 110 from a normal mode to a degeneration mode when the mode is switched from the normal mode to the degeneration mode by the mode selection unit 116. The notification device 60 is constituted, for example, by a buzzer or a lamp provided in a position where the occupant can view the lamp.

The arithmetic element 110 includes a temperature detection unit 111 that detects temperature of the arithmetic element 110, a voltage detection unit 112 that detects a voltage applied to the arithmetic element 110, an external device detection unit 113 that detects a use state of a external device (the cooling device 104 or the external communication device 105 described above) other than the arithmetic element 110, a basic traveling function unit 114 configured to execute control related to a basic traveling function of the vehicle, an automatic driving function unit 115 configured to execute control related to an automatic driving function of the vehicle, a mode selection unit 116 that selects the mode of the arithmetic element 110, and a cooling control unit 117 that generates a control signal of controlling an operation of the cooling device 104. The temperature detection unit 111, the voltage detection unit 112, the external device detection unit 113, the basic traveling function unit 114, the automatic driving function unit 115, the mode selection unit 116, and the cooling control unit 117 are provided in the memory. Each of the basic traveling function unit 114, the automatic driving function unit 115, or the like is constituted by a plurality of cores.

The temperature detection unit 111 is constituted by a thermocouple provided in a chip forming the arithmetic element 110. The temperature detection unit 111 detects temperature of the arithmetic element 110 itself. The temperature of the arithmetic element 110 is an example of a parameter indicating a state of the arithmetic element 110, and the temperature detection unit 111 is an example of an arithmetic element state detection unit.

The voltage detection unit 112 includes a voltage conversion section and a measurement section. The voltage detection unit 112 detects a power source voltage of the arithmetic element 110. A voltage applied to the arithmetic element 110 is an example of the parameter indicating the state of the arithmetic element 110, and the voltage detection unit 112 is an example of the arithmetic element state detection unit.

The basic traveling function unit 114 performs necessary control for basic traveling of the vehicle. As used herein, the term "basic traveling" refers to, for example, traveling to avoid an obstacle in a case where there is the obstacle in a traveling direction of the vehicle or traveling to causes the vehicle to position in a proper traveling lane. The basic traveling function unit 114 performs control related to, for example, assisting a steering operation to avoid an obstacle or assisting a brake operation.

The automatic driving function unit 115 performs necessary control, such as calculation of a traveling route of the vehicle or the like, for executing automatic driving. Specifically, the automatic driving function unit 115 sets a traveling route of the vehicle and sets a target motion of the vehicle such that the vehicle follows the traveling route.

Figure 3:
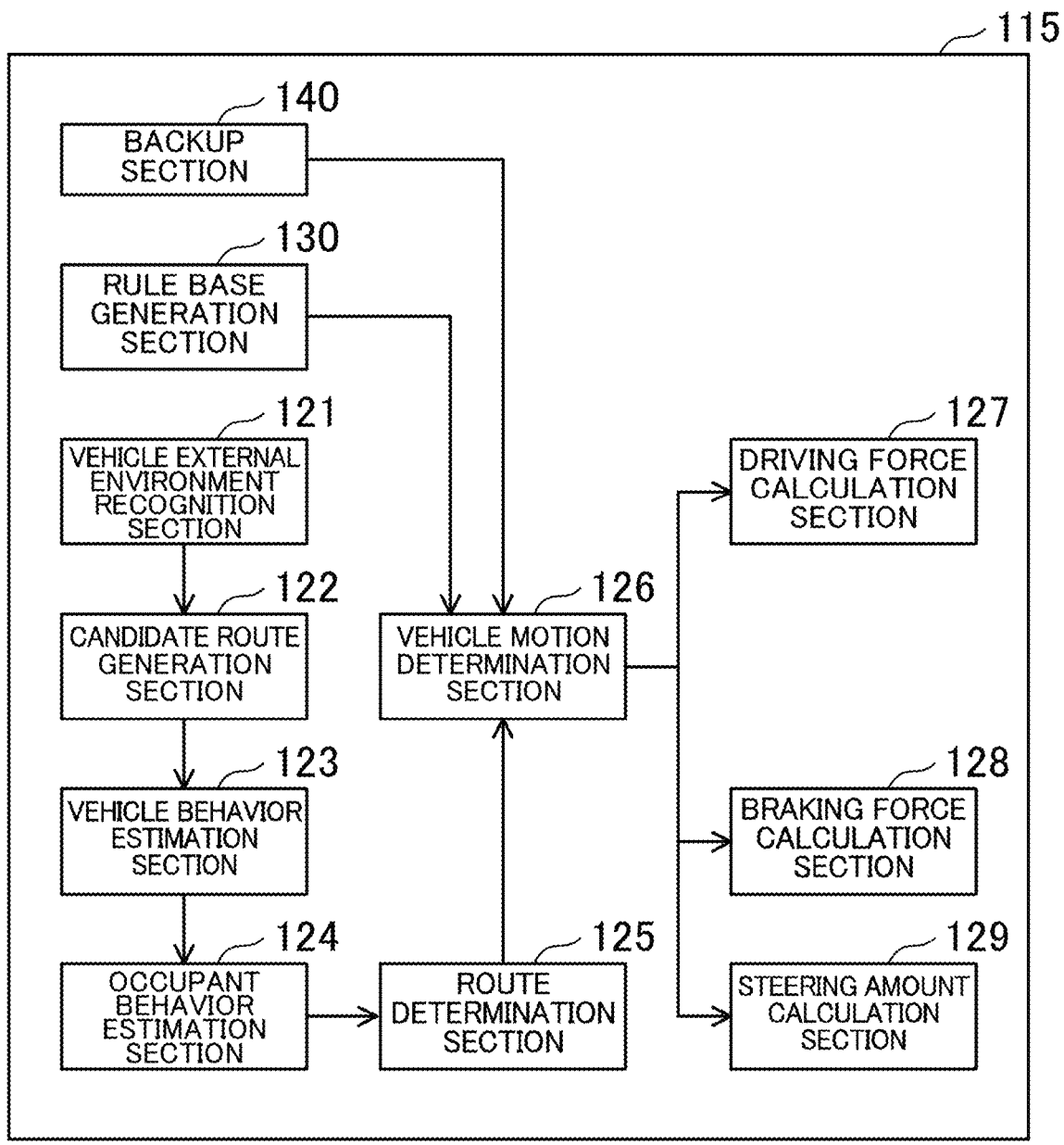
FIG. 3 is a block diagram illustrating a configuration of an automatic driving function unit.

FIG. 3 illustrates a function of the automatic driving function unit 115 in detail. The arithmetic element 110 includes a vehicle external environment recognition section 121 that recognizes a vehicle external environment, based on an output from the camera 101 or the like, in order to set the target motion of the vehicle, a candidate route generation section 122 that calculates one or more candidate routes on which the vehicle can travel in accordance with the vehicle external environment recognized by the vehicle external environment recognition section 121, a vehicle behavior estimation section 123 that estimates a behavior of the vehicle, an occupant behavior estimation section 124 that estimates a behavior of the occupant of the vehicle, a route determination section 125 that determines a route on which the vehicle is to travel, and a vehicle motion determination section 126 that determines a target motion of the vehicle that causes the vehicle to follow the route set by the route determination section 125. The arithmetic element 110 also includes a driving force calculation section 127, a braking force calculation section 128, and a steering amount calculation section 129. Each of the calculation sections 127, 128, and 129 calculates a target physical quantity (for example, a driving force, a braking force, and a steering angle) that a traveling device is to generate in order to achieve the target motion determined by the vehicle motion determination section 126. In order to ensure safety of automatic driving, the arithmetic element 110 includes a rule base route generation section 130 and a backup section 140.

The vehicle external environment recognition section 121 receives outputs of the camera 101, the radar 102, or the like mounted on the vehicle and information for another vehicle around the automobile transmitted from the external communication device 105 to recognize the vehicle external environment. The vehicle external environment to be recognized includes at least a road and an obstacle. Herein, the vehicle external environment recognition section 121 estimates a vehicle environment including the road and the obstacle by comparing a three-dimensional information of surroundings of the vehicle to a vehicle external environment model, based on data of the camera 101 and the radar 102. The vehicle external environment model is, for example, a learnt model generated by deep learning and, for the three-dimensional information of the surroundings of the vehicle, the road, the obstacle, or the like can be recognized using the vehicle external environment model.

The candidate route generation section 122 generates a candidate route on which the vehicle can travel, based on an output of the vehicle external environment recognition section 121 and the information transmitted from the external communication device 105 or the like.

For example, the candidate route generation section 122 generates a traveling route to avoid the obstacle recognized by the vehicle external environment recognition section 121 on the road recognized by the vehicle external environment recognition section 121. The output of the vehicle external environment recognition section 121 includes traveling route information related to a traveling route on which the vehicle travels. The traveling route information includes information related to a shape of the traveling route itself and information related to an object on the traveling route. The information related to the shape of the traveling route includes a traveling route shape (a straight line, a curve, a curve curvature), a traveling route width, the number of lanes, a width of each of the lanes, or the like. The information related to the object includes a relative position and relative speed of the object with respect to the vehicle, an attribute (a type, a moving direction) of the object, or the like. Examples of the type of the object include, for example, a vehicle, a pedestrian, a road, a section line, or the like.

Herein, the candidate route generation section 122 calculates a plurality of candidate routes using a state lattice method and selects one or more candidate routes, based on a route cost of each of the candidate routes from calculations results. The one or more candidate routes may be calculated using some other method.

The candidate route generation section 122 sets a virtual grid area on a traveling route, based on the traveling route information. The grid area includes a plurality of grid points. Based on the grid points, a position on the traveling route is specified. The candidate route generation section 122 sets a predetermined grid point to a target arrival position. Then, a plurality of candidate routes are calculated by route search using the plurality of grid points in the grid area. In the state lattice method, the route is branched from one grid point to an arbitrary grid point forward in the traveling direction of the vehicle. Therefore, each candidate route is set so as to sequentially pass the plurality of grid points. Each candidate route includes time information indicating a time at which the vehicle passes each grid point, speed information related to speed, acceleration, or the like at each grid point, information related to other vehicle motions, or the like.

The candidate route generation section 122 selects one or more traveling routes from the plurality of candidate routes, based on the route cost. Examples of the route cost herein include, for example, a degree of lane centering, acceleration of the vehicle, the steering angle, a possibility of a collision, or the like. In a case where the candidate route generation section 122 selects a plurality of traveling routes, the route determination section 125 selects one traveling route.

The vehicle behavior estimation section 123 measures the state of the vehicle from outputs of sensors, such as a vehicle speed sensor, an acceleration sensor, a yaw rate sensor, or the like, that detect a behavior of the automobile. The vehicle behavior estimation section 123 generates a vehicle 6-axis model indicating the behavior of the vehicle.

As used herein, the term "vehicle 6-axis model" refers to a model obtained by modeling accelerations in three axis directions, that is, a "front-rear direction," a "left-right direction," and an "up-down direction" of a traveling vehicle and angular velocities in three axis directions, that is, a "pitch," a "roll," and a "yaw." That is, the vehicle 6-axis model is a numerical model in which, instead of capturing a motion of the vehicle only on a plane (in the front-rear and left-right direction (X-Y movement) and a yaw movement (Z axis)) used in traditional vehicle motion engineering, the behavior of the vehicle is reproduced using six axis in total, that is, pitching (Y axis), a roll (X axis) movement, and a movement along the Z axis (up-down movement of the vehicle) of a vehicle body mounted on four wheels via suspensions.

The vehicle behavior estimation section 123 applies the vehicle 6-axis model to the traveling route generated by the candidate route generation section 122 to estimate the behavior of the automobile when the vehicle follows the traveling route.

The occupant behavior estimation section 124 estimates particularly a health state or a feeling of the driver from a captured image of a cabin camera or the like. Examples of the health state include, for example, being healthy, slight tired, unwell, in a consciousness lowered state, or the like. Examples of the feeling include, for example, feeling fun, normal, bored, irritated, unpleasant, or the like.

For example, the occupant behavior estimation section 124, for example, extracts a face image of the driver from images captured by the camera mounted on the cabin to identify the driver. The extracted face image and information of the identified driver are given to a human model as inputs. The human model is a learnt model generated, for example, by deep learning and, for each person that can be the driver of the vehicle, a health state and a feeling are output based on the face image. The occupant behavior estimation section 124 outputs the health state and the feeling of the driver output by the human model.

The occupant behavior estimation section 124 applies the human model to a vehicle behavior estimated by the vehicle behavior estimation section 123 to estimate a current change of the health state or a current change of the feeling of the current driver with respect to the vehicle behavior.

The route determination section 125 determines a route on which the vehicle is to travel, based on an output of the occupant behavior estimation section 124. In a case where there is only one route generated by the candidate route generation section 122, the route determination section 125 determines that the route is the route on which the vehicle is to travel. In a case where there are a plurality of routes generated by the candidate route generation section 122, in consideration of the output of the occupant behavior estimation section 124, the route determination section 125 selects one of the plurality of candidate routes, for example, for which the occupant (specifically, the driver) feels most comfortable, that is, a route that does not make the driver feel redundant, such as being too careful in avoiding an obstacle.

The rule base route generation section 130 recognizes an object outside the vehicle in accordance with a predetermined rule, based on outputs from the camera 101 and the radar 102, without using deep leaning and generates a traveling route that avoids the object. Similar to the candidate route generation section 122, the rule base route generation section 130 also calculates a plurality of candidate routes using the state lattice method and selects one or more candidate routes, based on a route cost of each one of the calculated candidate routes. In the rule base route generation section 130, for example, based on a rule of not entering within several meters from the object, the route cost is calculated. In this rule base route generation section 130, route calculation may be also performed using some other method.

Information of the route generated by the rule base route generation section 130 is input to the vehicle motion determination section 126.

The backup section 140 generates a traveling route used for guiding the vehicle 1 to a safe area, such as a road shoulder or the like, based on outputs from the camera 101 and the radar 102, when a sensor or the like fails or the occupant does not feel well. For example, the backup section 140 sets the safe area where the vehicle 1 can be stopped in an emergency, based on information of a position sensor SW5, and generates a traveling route until the vehicle reaches the safe area. Similar to the candidate route generation section 122, the backup section 140 calculates a plurality of candidate routes using the state lattice method and selects one or more candidate routes from the calculated candidate routes, based on a route cost of each one of the calculated candidate routes. Also in this backup section 140, route calculation may be performed using some other method.

Information of the route generated by the backup section 140 is input to the vehicle motion determination section 126.

The vehicle motion determination section 126 determines a target motion for the traveling route determined by the route determination section 125. The target motion refers to steering and acceleration and deceleration that cause the vehicle to follow the traveling route.

The route determination section 125 refers to the vehicle 6-axis model to calculate a motion of the vehicle body for the raveling route selected by the route determination section 125. The vehicle motion determination section 126 determines a target motion that causes the vehicle to follow the traveling route generated by the rule base route generation section 130. The vehicle motion determination section 126 determines a target motion that causes the vehicle to follow the traveling route generated by the backup section 140 that will be described later.

The vehicle motion determination section 126 selects, as a route on which the vehicle 1 is to travel, the traveling route generated by the rule base route generation section 130, when the traveling route determined by the route determination section 125 is largely deviated from the traveling route generated by the rule base route generation section 130.

The vehicle motion determination section 126 selects, as the route on which the vehicle 1 is to travel, the traveling route generated by the backup section 140, when a failure of a sensor or the like (specifically, the camera 101 or the radar 102) or unwellness of the occupant is estimated.

In order to achieve the target motion, the driving force calculation section 127 calculates a target driving force that a power train device (the engine 10, the motor 20, or the transmission 30) is to generate. In order to achieve the target motion, the braking force calculation section 128 calculates a target braking force that the brake 40 is to generate. In order to achieve the target motion, the steering amount calculation section 129 calculates a target steering angle that the steering 50 is to generate.

Calculation results of the driving force calculation section 127, the braking force calculation section 128, and the steering amount calculation section 129 are output to each device (the engine 10 or the like).

As described above, the automatic driving function unit 115 has many functions to execute automatic driving control and needs to process an enormous amount of information. Specifically, the automatic driving function unit 115 needs to process an enormous amount of image data output from the camera 101 and information related to traveling states of other automobiles output from the external communication device 105. Therefore, in an environment where an amount of data to be processed is large in an urban area or the like, heavy loads are applied on the arithmetic element 110.

When a huge load is applied to the arithmetic element 110, the temperature of the arithmetic element 110 increases. When the temperature of the arithmetic element 110 increases, there is a probability that the automatic driving function is deteriorated by an increase in internal resistance or the like.

When information to be processed by the arithmetic element 110 increases, undershoot of a voltage applied to the arithmetic element 110 is increased, so that an amplitude of the voltage is increased. When the amplitude of the voltage applied to the arithmetic element 110 is increased, there is a probability that some of the functions of the automatic driving function unit 115 do not operate due to insufficiency of the voltage.

In the first embodiment, the arithmetic element 110 is configured to be able to execute the normal mode in which both the basic traveling function unit 114 and the automatic driving function unit 115 are operated and the degeneration mode in which only the basic traveling function unit 114 is operated. The mode selection unit 116 is configured to select the normal mode or the degeneration mode, based on at least one of detection results of the temperature detection unit 111 and the voltage detection unit 112 and a detection result of the external device detection unit 113. More specifically, for the temperature of the arithmetic element 110, the mode selection unit 116 selects the degeneration mode when the temperature of the arithmetic element 110 becomes predetermined temperature or more or when it is predicted that the temperature of the arithmetic element 110 becomes the predetermined temperature or more. On the other hand, for the voltage applied to the arithmetic element 110, the mode selection unit 116 selects the degeneration mode when the amplitude of the voltage applied to the arithmetic element 110 becomes a predetermined amplitude or more or when it is predicted that the arithmetic element 110 becomes the predetermined amplitude or more. Selection of these modes will be described in detail below.

Selection of Mode Based on Temperature

Figure 4:
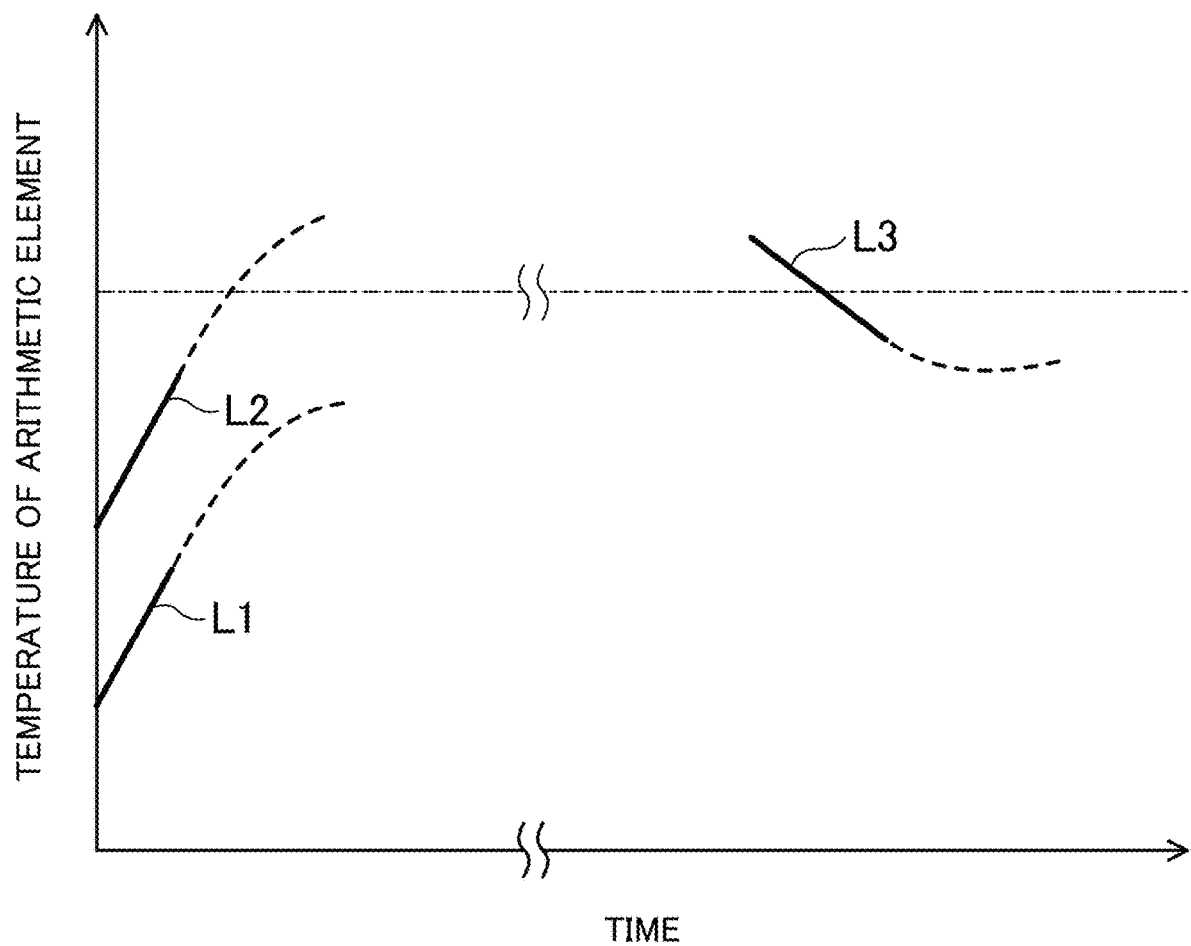
FIG. 4 is a time chart illustrating a relationship between temperature of an arithmetic element and a mode executed by the arithmetic element.

FIG. 4 is a time chart illustrating a relationship between the temperature of the arithmetic element 110 and the mode that is executed by the arithmetic element 110. In FIG. 4, a coordinate indicates the temperature of the arithmetic element 110. An alternate long and short dash line denoted by Tth in FIG. 4 indicates the predetermined temperature. Each of curved lines L1 to L3 indicates a temperature change of the arithmetic element 110, a solid line portion indicates temperature actually detected by the temperature detection unit 111, and an extended dashed line portion from the solid line portion indicates a temperature change predicted based on the solid line portion.

As illustrated in FIG. 4, in a case indicated by the curved line L1, since the curved line L1 including a predicted portion is below the predetermined temperature Tth, the mode selection unit 116 selects the normal mode as the mode of the arithmetic element 110. On the other hand, in a case indicated by the curved line L2, although an actual measured portion is below the predetermined temperature Tth, the predicted portion is on the predetermined temperature Tth or above. Therefore, the mode selection unit 116 selects the degradation mode as the mode of the arithmetic element 110.

For the curved line L3, the curved line L3 enters an area below the predetermined temperature Tth from an area of the predetermined temperature Tth or above, the predicted portion stays below the predetermined temperature Tth. At this time, the mode selection unit 116 selects the degradation mode as the mode of the arithmetic element 110 in the area where the temperature of the arithmetic element 110 is the predetermined temperature Tth or more, and on the other hand, when the temperature of the arithmetic element 110 enters the area below the predetermined temperature Tth, the mode selection unit 116 switches the mode of the arithmetic element 110 from the degeneration mode to the normal mode. Note that the temperature of the arithmetic element 110 drops because the mode of the arithmetic element 110 is switched to the degeneration mode so that a processing capacity of the arithmetic element 110 can be reduced.

Herein, the temperature change of the arithmetic element 110 is affected by an environment outside the arithmetic element 110. For example, while the cooling device 104 is in operation, the arithmetic element 110 is cooled down, and therefore, an increase of the temperature of the arithmetic element 110 is suppressed. When a communication amount of the external communication device 105 is large in in an urban area or the like, an amount of information input to the arithmetic element 110 is increased, and therefore, the temperature of the arithmetic element 110 tends to be increased.

Therefore, in the first embodiment, the mode selection unit 116 predicts whether the arithmetic element 110 becomes the predetermined temperature or more in consideration of at least one of the use state of the cooling device 104 and the communication amount of the external communication device 105 detected by the external device detection unit 113. Thus, prediction accuracy for the temperature of the arithmetic element 110 is increased.

Prediction of a temperature change of the arithmetic element 110 is enabled by storing a map for an increase of the temperature relative to a use time of the automatic driving function unit 115 in the arithmetic element 110 in advance. In predicting the temperature change of the arithmetic element 110, the mode selection unit 116 predicts the temperature change on an assumption that the arithmetic element 110 is operated in the normal mode.

As has been described above, by switching the mode of the arithmetic element 110, based on the temperature of the arithmetic element 110, the arithmetic element 110 can be properly used in accordance with the state of the arithmetic element 110. As a result, deterioration of the functions of the automatic driving function unit 115 can be suppressed.

The mode selection unit 116 may be configured to predict whether temperature of the arithmetic element 110 becomes the predetermined temperature or more in consideration of a detection result of the outside temperature sensor 103. That is, in summer or the like, since the air temperature is high, the temperature of the arithmetic element 110 is high even when the arithmetic element 110 is stopped. Therefore, the temperature of the arithmetic element 110 tends to be the predetermined temperature or more in summer or the like. On the other hand, in winter or the like, since the air temperature is low, the temperature of the arithmetic element 110 is less likely to be increased and is less likely to be the predetermined temperature or more. That is, the detection result of the outside temperature sensor 103 is related to the temperature change of the arithmetic element 110. Therefore, by taking the detection result of the outside temperature sensor 103 into consideration, prediction accuracy for the temperature change of the arithmetic element 110 can be increased.

In the first embodiment, when the temperature of the arithmetic element 110 becomes the predetermined temperature or more and the degeneration mode is selected as the mode of the arithmetic element 110, the occupant of the vehicle is notified of selection of the degeneration mode by the notification device 60. In the first embodiment, simultaneously with or after notification by the notification device 60, control of increasing a cooling capability of the cooling device 104 is executed by the cooling control unit 117. In this control, for example, in a case where the cooling device 104 is an air-conditioner, the cooling control unit 117 lowers temperature of an air blow or increase a volume of the blow. In a case where the cooling device 104 is a grill shutter, the cooling control unit 117 increases an opening of the grill shutter. Thus, when the temperature of the arithmetic element 110 is lowered to be below the predetermined temperature, the mode of the arithmetic element 110 can be quickly switched back to the normal mode from the degeneration mode. "Control of increasing the cooling capability" includes control of changing a state of the cooling device 104 from a stopped state to an operation state.

Figure 5:
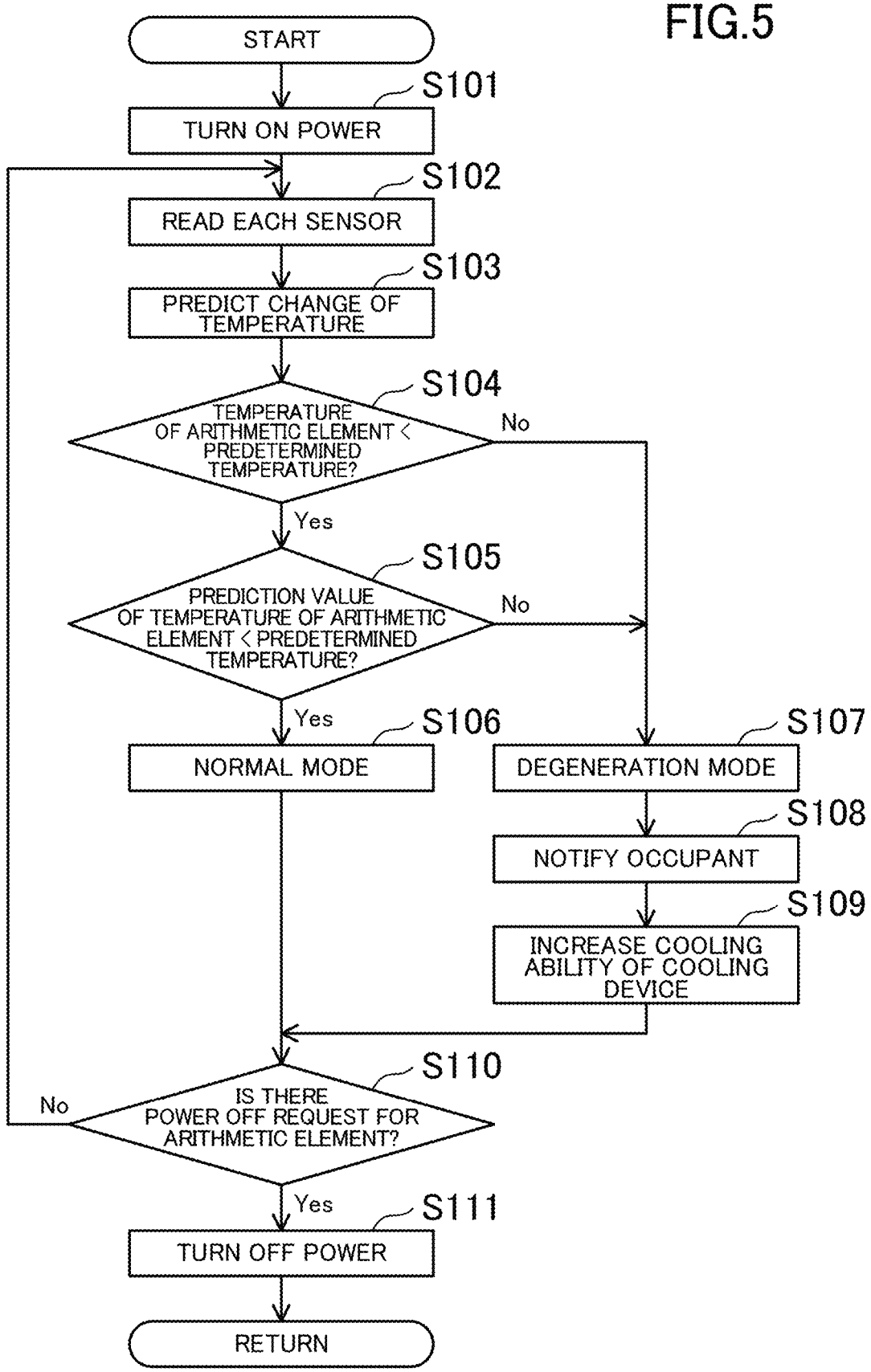
FIG. 5 is a flowchart illustrating a processing operation of switching the mode executed by the arithmetic element, based on the temperature of the arithmetic element.

Next, a processing operation when the arithmetic operation device switches the mode of the arithmetic element 110 by the mode selection unit 116, based on the temperature of the arithmetic element 110, will be described with reference to a flowchart of FIG. 5. In the flowchart, in an initial state, power of the arithmetic element 110 is off.

First, in Step S101, the power of the arithmetic element 110 is turned on.

Next, in Step S102, an output from each sensor is read.

Subsequently, in Step S103, the mode selection unit 116 predicts the temperature change of the arithmetic element 110. In Step S103, the mode selection unit 116 predicts, for example, the temperature 0.5 seconds after.

In subsequent Step S104, the mode selection unit 116 determines whether the current temperature of the arithmetic element 110 is less than the predetermined temperature. If the mode selection unit 116 has determined YES indicating that the temperature of the arithmetic element 110 is less than the predetermined temperature, the process proceeds to Step S105 and, if the mode selection unit 116 has determined NO indicating that the temperature of the arithmetic element 110 is the predetermined temperature or more, the process proceeds to Step S107.

In Step S105 described above, the mode selection unit 116 determines whether a prediction value of the temperature of the arithmetic element 110 predicted in the Step S103 described above is less than the predetermined temperature. If the mode selection unit 116 has determined YES indicating that the prediction value is less than the predetermined temperature, the process proceeds to Step S106 and, if the mode selection unit 116 determines NO indicating that the prediction value is the predetermined temperature or more, the process proceeds to Step S107.

In Step S106 described above, the mode selection unit 116 selects the normal mode. After Step S106, the process proceeds to Step S110.

In Step S107 described above, the mode selection unit 116 selects the degeneration mode.

In Step S108 described above, the arithmetic element 110 outputs a control signal to the notification device 60 to notify the occupant of the vehicle that the degeneration mode has been selected.

In next Step S109, control of increasing the cooling capability of the cooling device 104 is executed by the cooling control unit 117. After Step S109, the process proceeds to Step S110.

In Step S110 described above, whether there is a power off request in the arithmetic element 110 is determined. If it is determined YES indicating that there is a power off request, the process proceeds to Step S111, and on the other hand, if it is determined NO indicating that there is no power off request, the process returns to Step S102.

In Step S111 described above, the power of the arithmetic element 110 is turned off. After Step S111, the process returns.

As has been described above, selection of the mode of the arithmetic element 110 is performed, based on the temperature of the arithmetic element 110. In the above-described manner, if, when the temperature of the arithmetic element 110 is high or when it is predicted that the temperature of the arithmetic element 110 becomes high, the mode of the arithmetic element 110 is switched to the degeneration mode to reduce a load applied on the arithmetic element 110, an increase in the temperature of the arithmetic element 110 can be suppressed, so that deterioration of the functions of the arithmetic element 110 (specifically, the automatic driving function unit 115) can be suppressed. Therefore, deterioration of the automatic driving function can be more effectively suppressed.

Selection of Mode Based on Voltage

Figure 6:
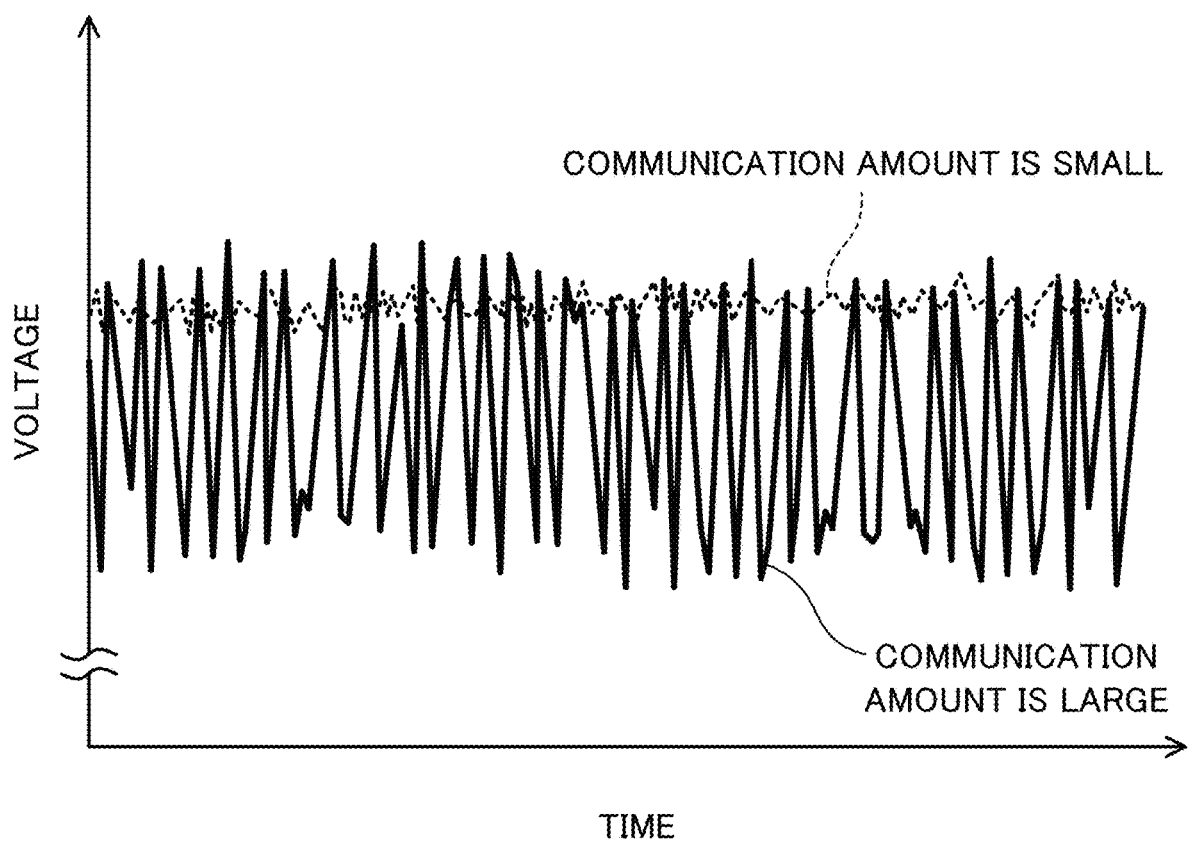
FIG. 6 is a graph illustrating an example of a voltage waveform detected by a voltage detection unit.

FIG. 6 illustrates an example of a power source voltage of the arithmetic element 110 detected by the voltage detection unit 112. The dashed line indicates a waveform of the voltage in a case where an amount of information that is input to the arithmetic element 110 is small, for example, in a suburb or the like, and the solid line indicates a waveform of the voltage in a case where the amount of information that is input to the arithmetic element 110 is large, for example, in an urban area or the like.

As illustrated in FIG. 6, in a case where the amount of information that is input to the arithmetic element 110 is large, information processed by the automatic driving function unit 115 is increased, so that an operation rate of the cores constituting the automatic driving function unit 115 is increased. Therefore, an amplitude of the voltage is large at a side where the voltage is low. Thus, voltage insufficiency occurs and the cores constituting the automatic driving function unit 115 cannot be operated, so that the functions of the automatic driving function unit 115 are deteriorated. Therefore, the mode selection unit 116 selects the degeneration mode when the amplitude of the voltage applied to the arithmetic element 110 is the predetermined amplitude or more or when it is predicted that the amplitude of the voltage applied to the arithmetic element 110 is the predetermined amplitude or more. The automatic driving function unit 115 is caused not to be operated by selecting the degeneration mode by the mode selection unit 116, so that deterioration of the functions of the automatic driving function unit 115 can be suppressed.

Fluctuation of the voltage can be predicted to some extent, based on the communication amount of the external communication device 105. That is, when the communication amount of the external communication device 105, for example, in an urban area or the like is large, the amount of information that is input to the arithmetic element 110 tends to be large, and therefore, undershoot of the voltage tends to be increased (that is, the amplitude of the voltage tends to be increased). Therefore, in the first embodiment, the mode selection unit 116 predicts whether the amplitude of the voltage applied to the arithmetic element 110 is the predetermined amplitude or more in consideration of the communication amount of the external communication device 105 detected by the external device detection unit 113. Thus, prediction accuracy for a voltage fluctuation of the arithmetic element 110 can be increased.

Figure 7:
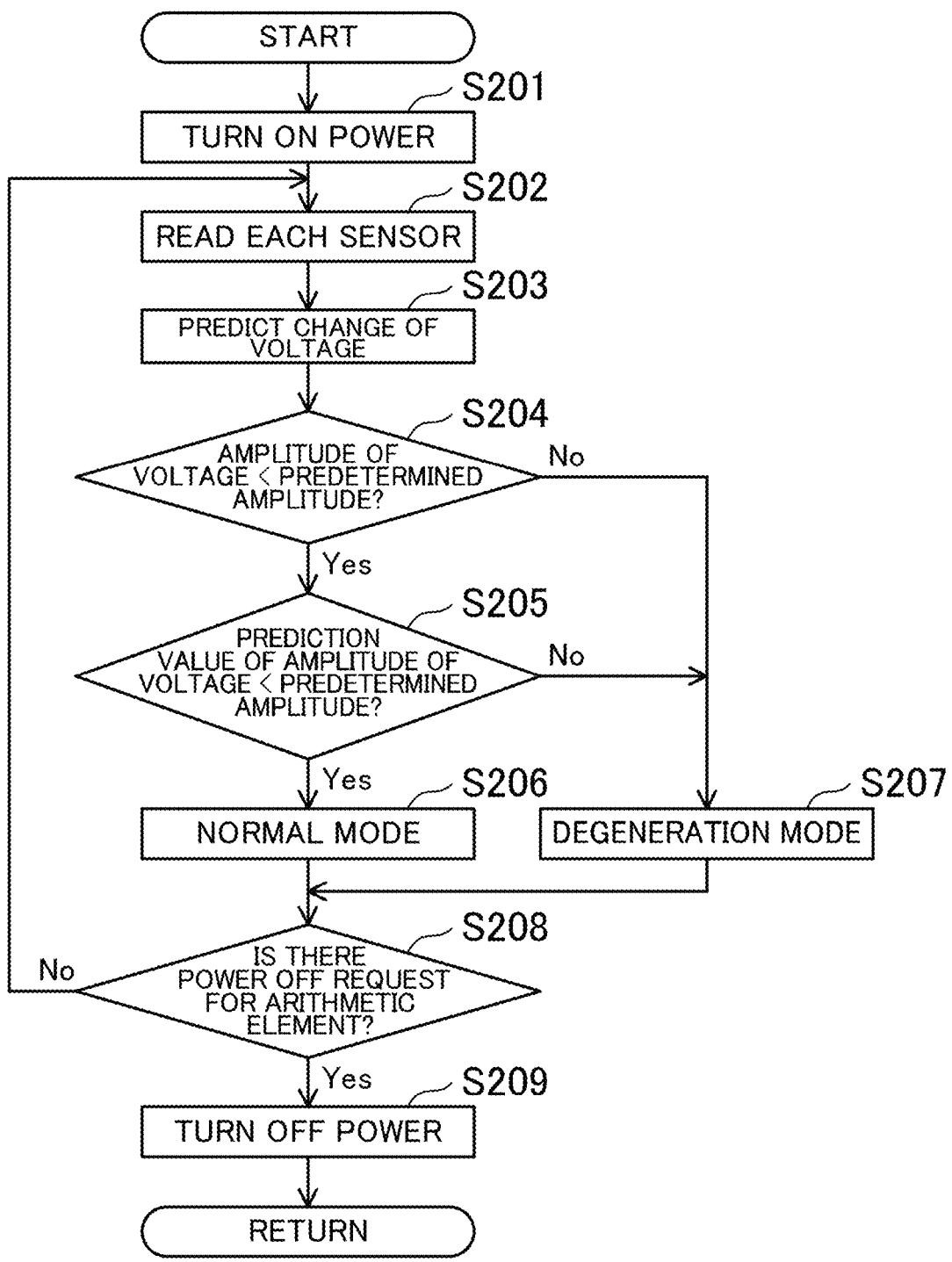
FIG. 7 is a flowchart illustrating a processing operation of switching the mode executed by the arithmetic element, based on a voltage applied to the arithmetic element.

Next, a processing operation when the arithmetic operation device selects the mode of the arithmetic element 110 by the mode selection unit 116, based on the voltage applied to the arithmetic element 110, will be described with reference to a flowchart of FIG. 7. In the flowchart, the power of the arithmetic element 110 is off in an initial state.

First, in Step S201, the power of the arithmetic element 110 is turned on.

Next, in Step S202, an output from each sensor is read.

Subsequently, in Step S203, the mode selection unit 116 predicts a change of the voltage of the arithmetic element 110. In Step S103, the mode selection unit 116 predicts, for example, an amplitude of the voltage 0.5 seconds after.

In subsequent Step S204, the mode selection unit 116 determines whether the amplitude of the current voltage applied to the arithmetic element 110 is less that the predetermined amplitude. If it is determined YES indicating that the amplitude is less than the predetermined amplitude, the process proceeds to Step S205 and, if it is determined NO indicating that the amplitude is the predetermined amplitude or more, the process proceeds to Step S207.

In Step S205 described above, the mode selection unit 116 determines whether a prediction value of the amplitude of the voltage applied to the arithmetic element 110 which has been predicted in Step S203 described above is less than the predetermined amplitude. If it is determined YES indicating that the prediction value is less than the predetermined amplitude, the process proceeds to Step S206 and, if it is determined NO indicating that the prediction value is the predetermined amplitude or more, the process proceeds to Step S207.

In Step S206 described above, the mode selection unit 116 selects the normal mode.

In Step S207 described above, the mode selection unit 116 selects the degeneration mode.

In Step S208 described above, whether there is a power off request in the arithmetic element 110 is determined. If it is determined YES indicating that there is a power off request, the process proceeds to Step S211 and, on the other hand, if it is determined NO indicating that there is no power off request, the process returns to Step S202.

In Step S211 described above, the power of the arithmetic element 110 is turned off. After the Step S211, the process returns.

In the above-described manner, selection of the mode, based on the voltage applied to the arithmetic element 110, is performed. As described above, when the amplitude of the voltage applied to the arithmetic element 110 is large or when it is predicted that the amplitude of the voltage applied to the arithmetic element 110 becomes large, the mode is switched to the degeneration mode to reduce the load of the arithmetic element 110, so that disturbance of the voltage applied to the arithmetic element 110 can be suppressed and thus deterioration of the functions of the arithmetic element 110 (specifically, the automatic driving function unit 115) can be suppressed. Accordingly, deterioration of the automatic driving function can be more effectively suppressed.

Therefore, in the first embodiment, the arithmetic operation device includes the arithmetic element 110, the arithmetic element state detection unit (the temperature detection unit 111, the voltage detection unit 112) that detects the parameter (temperature, voltage) indicating the state of the arithmetic element 110, the external device detection unit 113 that detects the use state of the device (the cooling device 104, the external communication device 105) that affects the parameter from outside of the arithmetic element 110, the basic traveling function unit 114 provided in the arithmetic element 110 and configured to execute control related to the basic traveling function of the automobile, the automatic driving function unit 115 provided in the arithmetic element 110 and configured to execute control related to the automatic traveling function of the automobile, and the mode selection unit 116 provided in the arithmetic element 110 and configured to select one of the normal mode in which both the basic traveling function unit 114 and the automatic driving function unit 115 are operated and the degeneration mode in which only the basic traveling function unit 114 is operated, based on the detection result of the arithmetic element state detection unit and the detection result of the external device detection unit 113, and the mode selection unit 116 selects the degeneration mode when the parameter exceeds a threshold or when it is predicted that the parameter exceeds the threshold. Thus, the normal mode or the degeneration mode is selected based on the parameter (the temperature, an amplitude of the voltage) indicating the state of the arithmetic element 110 and the use state of the device. In the normal mode, automatic driving control is executed, and therefore, the load applied on the arithmetic element is relatively large. On the other hand, in the degeneration mode, only the basic traveling function unit is operated, and therefore, the load applied to the arithmetic element is relatively small. Therefore, by selecting the normal mode or the degeneration mode in accordance with the parameter indicating the state of the arithmetic element 110, the arithmetic element can be used in accordance with the state of the arithmetic element. As a result, deterioration of the automatic driving function can be suppressed.

Second Embodiment

A second embodiment will be described in detail below with reference to the drawings. In the following description, each component common to that in the first embodiment is identified by the same reference symbol as that in the first embodiment, and the description thereof will not be repeated.

The second embodiment is different from the first embodiment in that, when it is predicted that the parameter (the temperature, the voltage, or the like) indicating the state of the arithmetic element 110 exceeds a threshold, the mode selection unit 116 does not select the degeneration mode but selects an intermediate mode in which both the basic traveling function unit 114 and the automatic driving function unit 115 are operated while the functions of the automatic driving function unit 115 are limited as compared to those in the normal mode. By selecting the intermediate mode by the mode selection unit 116, the parameter (the temperature, the voltage, or the like) can be prevented from exceeding the threshold as much as possible while the automatic driving is continued. Moreover, by interposing the intermediate mode once, even when the degeneration mode is eventually selected, an uncomfortable feeling is not given to the occupant of the vehicle.

Herein, the intermediate mode is, for example, a mode in which, as compared to the normal mode, an imaging range of the camera 101 is made narrower or a resolution of image data output from the camera 101 is reduced to limit the functions of the automatic driving function unit 115. In a case where the intermediate mode is selected, it is preferable to set a condition for a speed limit or the like, that is, for example, a condition where automatic driving control is executed in a range where vehicle speed is 30 km/h or less and manual driving is executed in a range where the vehicle speed exceeds 30 km/h.

Figure 8:
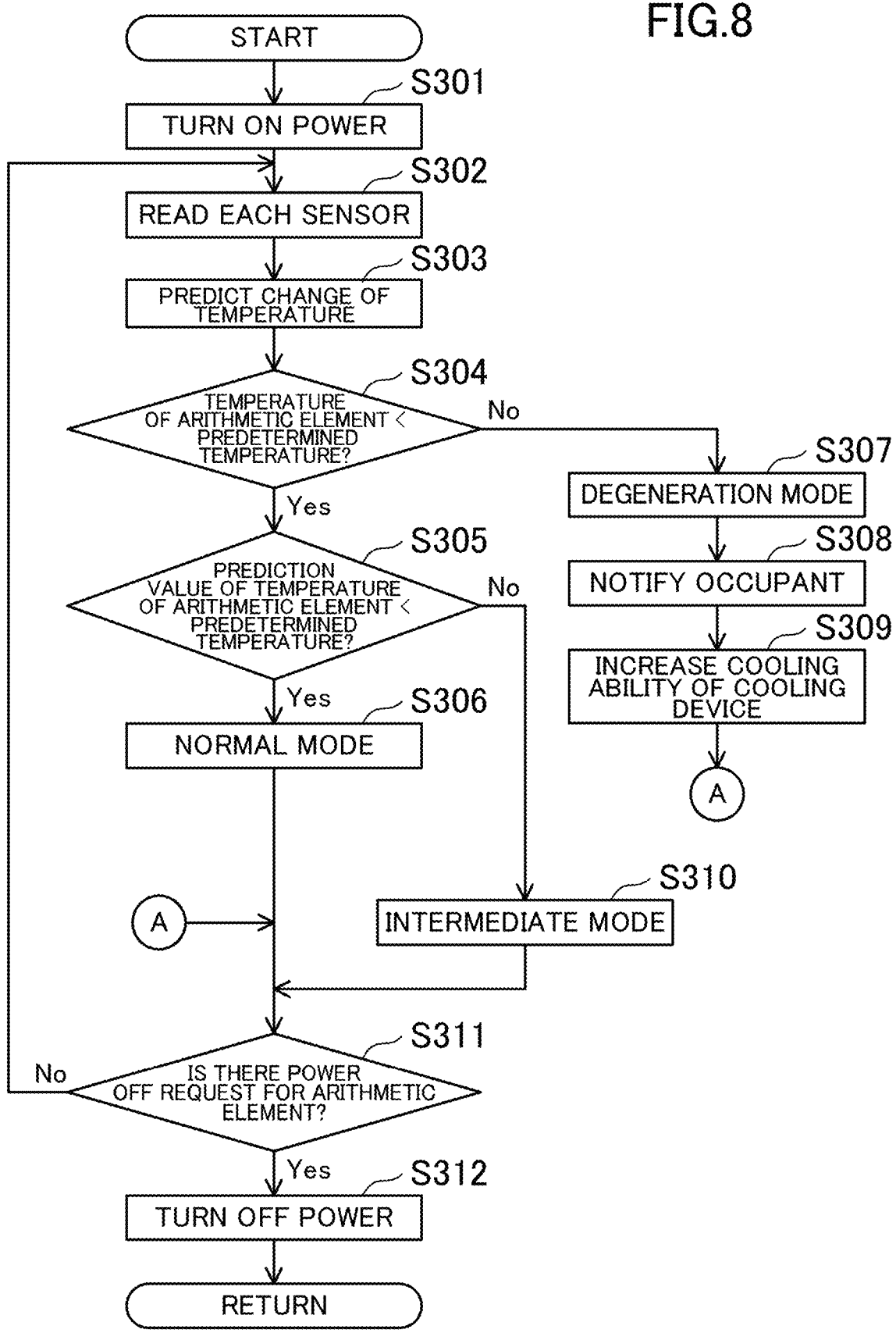
FIG. 8 is a flowchart illustrating a processing operation of switching a mode executed by an arithmetic element, based on temperature of an arithmetic element in an automatic arithmetic operation device according to a second embodiment.

FIG. 8 illustrates a flowchart when the mode selection unit 116 selects the mode of the arithmetic element 110 in the second embodiment. In the flowchart, as the parameter, the temperature of the arithmetic element 110 is employed. Also, in the flowchart, in an initial state, the power of the arithmetic element 110 is off First, in Step S301, the power of the arithmetic element 110 is turned on.

Next, in Step S302, an output from each sensor is read.

Subsequently, in Step S303, the mode selection unit 116 predicts a change of the temperature of the arithmetic element 110. In Step S303, the mode selection unit 116 predicts, for example, the temperature 0.5 seconds after.

In subsequent Step S304, the mode selection unit 116 determines whether the current temperature of the arithmetic element 110 is less than the predetermined temperature. If it is determined YES indicating that the temperature of the arithmetic element 110 is less than the predetermined temperature, the process proceeds to Step S305 and, if it is determined NO indicating the temperature of the arithmetic element 110 is the predetermined temperature or more, the process proceeds to Step S307.

In Step S305 described above, the mode selection unit 116 determines whether a prediction value of the temperature of the arithmetic element 110 predicted in the Step S303 described above is less than the predetermined temperature. If it is determined YES indicating that the prediction value is less than the predetermined temperature, the process proceeds to Step S306 and, if it is determined NO indicating that the prediction value is the predetermined temperature or more, the process proceeds to Step S310.

In Step S306 described above, the mode selection unit 116 selects the normal mode. After Step S306, the process proceeds to Step S311.

In Step S307 described above, the mode selection unit 116 selects the degeneration mode.

In Step S308 described above, the arithmetic element 110 outputs a control signal to the notification device 60 to notify the occupant of the vehicle that the degeneration mode has been selected.

In subsequent Step S309, the cooling control unit 117 executes control of increasing cooling ability of the cooling device 104. After Step S309, the process proceeds to Step S311.

In Step S310 described above, the mode selection unit 116 selects the intermediate mode. After Step S309, the process proceeds to Step S311.

In Step S311 described above, whether there is a power off request in the arithmetic element 110 is determined. If it is determined YES indicating that there is a power off request, the process proceeds to Step S312 and, on the other hand, if it is determined NO indicating that there is no power off request, the process returns to Step S302.

In Step S312 described above, the power of the arithmetic element 110 is turned off. After Step S312, the process returns.

Although a case where the temperature is employed as the parameter has been described, the voltage applied to the arithmetic element 110 may be employed as the parameter.

Accordingly, also in the second embodiment, by selecting the normal mode, the intermediate mode, or the degeneration mode in accordance with the parameter indicating the state of the arithmetic element 110, the arithmetic element can be properly used in accordance with the state of the arithmetic element. As a result, deterioration of the automatic driving function can be suppressed. Also, by selecting the intermediate mode by the mode selection unit 116, the parameter (the temperature, the voltage, or the like) can be prevented from exceeding the threshold as much as possible while the automatic driving is continued. Moreover, by interposing the intermediate mode once, even when the degeneration mode is eventually selected, an uncomfortable feeling is not given to the occupant of the vehicle.

Other Embodiments

The technology disclosed herein is not limited to the above-described embodiments and can be substituted without departing from the spirit and scope of the present disclosure.

For example, the above-described first and second embodiments, the mode selection unit 116 predicts a change of the temperature of the arithmetic element 110 or a change of the amplitude of the voltage. However, the present disclosure is not limited thereto, and a calculation unit that predicts a change of the temperature of the arithmetic element 110 or a change of the amplitude of the voltage may be separately provided in the arithmetic element 110.

In the above-described first and second embodiments, the notification device 60 is provided. However, the notification device 60 may be omitted. That is, when the degeneration mode is selected in a case where the temperature of the arithmetic element 110 is employed as the parameter, the cooling ability of the cooling device 104 may be increased without performing notification by the notification device 60.

In the above-described second embodiment, the mode selection unit 116 increases the cooling ability of the cooling device 104 only when the mode selection unit 116 selects the degeneration mode. The present disclosure is not limited thereto, and the cooling ability of the cooling device 104 may be increased also when the mode selection unit 116 selects the intermediate mode.

The above-described embodiments are mere examples, and the scope of the present disclosure should not be restrictively interpreted. The scope of the present disclosure is defined by the appended claims, and all modifications and changes within an equivalent scope of the claims fall within the scope of the present disclosure.

INDUSTRIAL APPLICABILITY

The technology disclosed herein is useful as an arithmetic operation device for automobiles mounted on an automobile capable of automatic driving control.

DESCRIPTION OF REFERENCE CHARACTERS

60 Notification device
104 Cooling device (device affecting parameter from outside of arithmetic element)
105 External communication device (device affecting parameter from outside of arithmetic element)
110 Arithmetic element
111 Temperature detection unit (arithmetic element state detection unit)
112 Voltage detection unit (arithmetic element state detection unit)
113 External device detection unit
114 Basic traveling function unit
115 Automatic driving function unit
116 Mode selection unit

The invention claimed is:

1. An arithmetic operation device for automobiles mounted on an automobile capable of automatic driving control, comprising:
    arithmetic circuitry:
    arithmetic state detection circuitry configured to detect a parameter indicating a state of the arithmetic circuitry, the parameter including a voltage applied to the arithmetic circuitry, and the arithmetic state detection circuitry being further configured to detect the voltage applied to the arithmetic circuitry;
    external device detection circuitry configured to detect a use state of an external device that affects the parameter from outside of the arithmetic circuitry;
    basic traveling function circuitry provided in the arithmetic circuitry and configured to execute control related to a basic traveling function of the automobile;
    automatic driving function circuitry provided in the arithmetic circuitry and configured to execute control related to an automatic driving function of the automobile; and
    mode selection circuitry provided in the arithmetic circuitry and configured to select, based on a detection result of the arithmetic state detection circuitry and a detection result of the external device detection unit-circuitry, one of a normal mode in which both the basic traveling function circuitry and the automatic driving function circuitry are operated and a degeneration mode in which only the basic traveling function circuitry is operated, wherein
    the mode selection circuitry is further configured to select the degeneration mode when an amplitude of the voltage applied to the arithmetic circuitry exceeds a predetermined amplitude or when it is predicted that the amplitude of the voltage applied to the arithmetic circuitry exceeds the predetermined amplitude.

2. The arithmetic operation device for automobiles of claim 1, wherein
    the parameter further includes a temperature of the arithmetic circuitry,
    the arithmetic state detection unit circuitry is further configured to detect the temperature of the arithmetic circuitry, and
    the mode selection circuitry is further configured to select the degeneration mode when the temperature of the arithmetic circuitry exceeds a predetermined temperature or when it is predicted that the temperature of the arithmetic circuitry exceeds the predetermined temperature.

3. The arithmetic operation device for automobiles of claim 2, wherein
    the external device includes an external communication device mounted on the automobile and configured to output information communicated with the outside of the automobile to the arithmetic circuitry, and
    the mode selection circuitry is further configured to predict whether the temperature of the arithmetic circuitry exceeds the predetermined temperature in consideration of a communication amount of the external communication device detected by the external device detection circuitry.

4. The arithmetic operation device for automobiles of claim 2, wherein
    the external device includes a cooling device mounted on the automobile, and
    the mode selection circuitry is further configured to predict whether the temperature of the arithmetic circuitry exceeds the predetermined temperature in consideration of a use state of the cooling device detected by the external device detection circuitry.

5. The arithmetic operation device for automobiles of claim 4, wherein
    the external device further includes an external communication device mounted on the automobile and configured to output information communicated with the outside of the automobile to the arithmetic circuitry, and
    the mode selection circuitry is further configured to predict whether the temperature of the arithmetic circuitry exceeds the predetermined temperature in consideration of a communication amount of the external communication device detected by the external device detection circuitry.

6. The arithmetic operation device for automobiles of claim 4, further comprising:
    notification circuitry configured to notify an occupant of the automobile that the mode selection circuitry has selected the degeneration mode when the mode selection circuitry selects the degeneration mode; and cooling control circuitry configured to control an operation of the cooling device, wherein the cooling control circuitry is further configured to increase a cooling ability of the cooling device simultaneously with or after notification by the notification circuitry.

7. The arithmetic operation device for automobiles of claim 6, wherein the external device further includes an external communication device mounted on the automobile and configured to output information communicated with the outside of the automobile to the arithmetic circuitry, and the mode selection circuitry is further configured to predict whether the temperature of the arithmetic circuitry exceeds the predetermined temperature in consideration of a communication amount of the external communication device detected by the external device detection circuitry.

8. The arithmetic operation device for automobiles of claim 1, wherein the external device includes an external communication device mounted on the automobile and configured to output information communicated with the outside of the automobile to the arithmetic circuitry, and the mode selection circuitry is further configured to predict whether the amplitude of the voltage of the arithmetic circuitry exceeds the predetermined amplitude in consideration of a communication amount of the external communication device detected by the external device detection circuitry.

9. An arithmetic operation device for automobiles mounted on an automobile capable of automatic driving control, comprising:

arithmetic circuitry;

arithmetic state detection circuitry configured to detect a parameter indicating a state of the arithmetic circuitry, the parameter including a voltage applied to the arithmetic circuitry, and the arithmetic state detection circuitry being further configured to detect the voltage applied to the arithmetic circuitry;

external device detection circuitry configured to detect a use state of an external device that affects the parameter from outside of the arithmetic circuitry;

basic traveling function circuitry provided in the arithmetic circuitry and configured to execute control related to a basic traveling function of the automobile;

automatic driving function circuitry provided in the arithmetic circuitry and configured to execute control related to an automatic driving function of the automobile; and mode selection circuitry provided in the arithmetic circuitry and configured to select, based on a detection result of the arithmetic state detection circuitry and a detection result of the external device detection circuitry, one of a normal mode in which both the basic traveling function circuitry and the automatic driving function circuitry are operated, an intermediate mode in which both the basic traveling function circuitry and the automatic driving function circuitry are operated while a degree of functional operation of the automatic driving function circuitry is limited as compared to that in the normal mode, and a degeneration mode in which only the basic traveling function circuitry is operated, wherein the mode selection circuitry is further configured to select the degeneration mode when an amplitude of the voltage applied to the arithmetic circuitry exceeds a threshold amplitude, and select the intermediate mode when it is predicted that the amplitude of the voltage applied to the arithmetic circuitry exceeds the threshold amplitude.

10. The arithmetic operation device for automobiles of claim 9, wherein the parameter further includes a temperature of the arithmetic circuitry, the arithmetic state detection circuitry is further configured to detect the temperature of the arithmetic circuitry, and the mode selection circuitry is further configured to select the degeneration mode when the temperature of the arithmetic circuitry exceeds a predetermined temperature, and select the intermediate mode when it is predicted that the temperature of the arithmetic circuitry exceeds the predetermined temperature.

11. The arithmetic operation device for automobiles of claim 10, wherein the external device includes an external communication device mounted on the automobile and configured to output information communicated with the outside of the automobile to the arithmetic circuitry, and the mode selection circuitry is further configured to predict whether the temperature of the arithmetic circuitry exceeds the predetermined temperature in consideration of a communication amount of the external communication device detected by the external device detection circuitry.

12. The arithmetic operation device for automobiles of claim 10, wherein the external device includes a cooling device mounted on the automobile, and the mode selection circuitry is further configured to predict whether the temperature of the arithmetic circuitry exceeds the predetermined temperature in consideration of a use state of the cooling device detected by the external device detection circuitry.

13. The arithmetic operation device for automobiles of claim 12, further comprising:

notification circuitry configured to notify an occupant of the automobile that the mode selection circuitry has selected the degeneration mode when the mode selection circuitry selects the degeneration mode; and cooling control circuitry configured to control an operation of the cooling device, wherein the cooling control circuitry is further configured to increase a cooling ability of the cooling device simultaneously with or after notification by the notification circuitry.

* * * * *